United States Patent
Naaman et al.

(10) Patent No.: US 11,829,888 B2
(45) Date of Patent: Nov. 28, 2023

(54) MODIFYING ARTIFICIAL INTELLIGENCE MODELS USING MODEL FRAGMENTS

(71) Applicant: International Business Machines Corporation, Armonk, NY (US)

(72) Inventors: Nir Naaman, Haifa (IL); Ira Rosen, Haifa (IL); Lior Turgeman, Moreshet (IL); Nili Guy, Haifa (IL); Samuel Kallner, Tal Menashe (IL); Adar Amir, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 16/365,721

(22) Filed: Mar. 27, 2019

(65) Prior Publication Data

US 2020/0311561 A1    Oct. 1, 2020

(51) Int. Cl.
- *G06N 5/02* (2023.01)
- *G06F 9/50* (2006.01)
- *G06N 20/00* (2019.01)
- *G06F 11/34* (2006.01)

(52) U.S. Cl.
CPC ............. *G06N 5/02* (2013.01); *G06F 9/5011* (2013.01); *G06F 11/3409* (2013.01); *G06N 20/00* (2019.01)

(58) Field of Classification Search
CPC ........ G06N 5/02; G06N 20/00; G06F 9/5011; G06F 11/3409; H04L 63/104; H04L 67/34

See application file for complete search history.

(56) References Cited

U.S. PATENT DOCUMENTS

| | | | |
|---|---|---|---|
| 2015/0248609 A1 | 9/2015 | Julian et al. | |
| 2016/0358070 A1* | 12/2016 | Brothers | G06N 3/082 |
| 2018/0046926 A1* | 2/2018 | Achin | G06N 20/20 |
| 2018/0137858 A1* | 5/2018 | Saxena | G10L 15/22 |
| 2018/0359084 A1* | 12/2018 | Jain | H04L 9/08 |
| 2019/0036716 A1* | 1/2019 | Kasaragod | H04L 63/104 |
| 2020/0057689 A1* | 2/2020 | Farahat | G06F 11/0751 |
| 2020/0167202 A1* | 5/2020 | Huang | G05B 13/0265 |
| 2020/0250523 A1* | 8/2020 | Ren | G06N 3/08 |

(Continued)

FOREIGN PATENT DOCUMENTS

EP          3370159 A1    9/2018

OTHER PUBLICATIONS

Nikita Mishra et al., Controlling AI Engines in Dynamic Environments, Published: Architectural Support for Programming Languages and Operating Systems (ASPLOS) 2018, Conference '17, Washington, DC, USA, pp. 3.

(Continued)

*Primary Examiner* — Wynuel S Aquino
(74) *Attorney, Agent, or Firm* — Barry D. Blount (57) ABSTRACT

An example system includes a processor to monitor system resources and performance preferences. The processor is to select model fragments based on the system resources and the performance preferences. The processor is to also construct a running artificial intelligence (AI) model from the selected model fragments. The processor is to further automatically modify the running AI model using the model fragments in response to detecting a change in the system resources or a change in the performance preferences.

20 Claims, 7 Drawing Sheets

(56) References Cited

U.S. PATENT DOCUMENTS

2020/0272859 A1\* 8/2020 Lashyn ................... H04L 67/10
2022/0058056 A1\* 2/2022 Opsenica ............... G06N 3/006

OTHER PUBLICATIONS

Chao-Long Zhang et al., Fuzzy Neural Network Based Dynamic Data Allocation Model on Heterogeneous Multi-GPUs for Large-Scale Computations, International Journal of Automation and Computing, 15(2), Apr. 2018, pp. 181-193.

\* cited by examiner

MODIFYING ARTIFICIAL INTELLIGENCE MODELS USING MODEL FRAGMENTS

BACKGROUND

The present techniques relate to artificial intelligence (AI) models. More specifically, the techniques relate to modifying AI models.

SUMMARY

According to an embodiment described herein, a system can include processor to monitor system resources and performance preferences. The processor can also further select model fragments based on the system resources and the performance preferences. The processor can also construct a running artificial intelligence (AI) model from the selected model fragments. The processor can also further automatically modify the running AI model using the model fragments in response to detecting a change in the system resources or a change in the performance preferences.

According to another embodiment described herein, a computer-implemented method can include monitoring, via a processor, system resources and performance preferences. The method can further include selecting, via the processor, model fragments based on the system resources and the performance preferences. The method can also further include constructing, via the processor, a running artificial intelligence (AI) model from the selected model fragments. The method can also include automatically modify, via the processor, the running AI model using the model fragments in response to detecting a change in the system resources or a change in the performance preferences.

According to another embodiment described herein, a computer program product for automatically modify running AI models using model fragments can include computer-readable storage medium having program code embodied therewith. The computer readable storage medium is not a transitory signal per se. The program code executable by a processor to cause the processor to monitor system resources and performance preferences. The program code can also cause the processor to select model fragments based on the system resources and the performance preferences. The program code can also cause the processor to construct a running artificial intelligence (AI) model from the selected model fragments. The program code can also cause the processor to automatically modify the running AI model using the model fragments in response to detecting a change in the system resources or a change in the performance preferences.

DETAILED DESCRIPTION

Artificial Intelligence (AI) and Machine Learning (ML) are used in a broad range of domains. However, creating and training AI models may involve large amount of resources in terms of processing, memory, and storage. Moreover, specialized hardware such as Graphic Processing Units (GPUs) is often used to allow models to run in less time. Due to their high usage of resources, AI models may be developed, trained, and executed in the cloud or in a data center. However, AI services typically process data that is generated at the edge. As used herein, the edge refers to an environment outside the cloud or data center where the AI model is executed. This means that the data has to be transferred from the edge to the cloud or the data center, which may result in several drawbacks. For example, some models may use a lot of bandwidth during transfer and may transfer in unreasonable times. Moreover, such transfers may be subject to inadvertent interruptions, or periods of limited bandwidth. In addition, such data transfers may present issues related to privacy and security.

Edge computing brings computing or processing power to the edge, and thus closer to the data sources. In particular, edge computing is used to reduce the amount of data sent to the cloud by processing data locally on an edge device. Thus, significant portions of the data processing can be performed at the edge, close to where the data is generated, dramatically reducing the amount of data that has to be sent to the cloud. Edge processing may allow more data to be processed and at a lower cost. Edge computing may also enable users to work while disconnected from the cloud. Thus, edge computing may be used in cases where communication with the cloud is unreliable or is not always available. In addition, edge computing provides privacy and security. In certain cases, some of the data must remain local and cannot be sent to the cloud, for example, due to regulatory reasons or other reasons. For example, users may want to minimize the data exchange with the cloud to reduce the security risks involved. Finally, edge computing provides faster reaction time. In several use cases, edge computing may be used to provide a fast reaction and ability to process the data on the edge and react immediately.

In many cases, the resources available on the edge may be considerably lower than those available on the cloud. For example, these resources may include computational resources, memory, storage, power, etc. Some edge computing techniques use a hybrid approach where parts of the AI service run on the edge and are complemented by other parts that run in the cloud. For example, building and training models, which may use significant compute and storage resources, may be run in the cloud, while model inference may be performed in real time on the edge. However, the edge environment may be very heterogeneous, and the available resources can significantly vary from one environment to another. Moreover, even within the same environment, the available resources may dynamically change over time. For example, available compute, memory, and storage may vary based on the different tasks executed on an edge node. As another example, available power may vary for battery-operated edge nodes. Therefore, adaptation of the AI models to the resource limited edge environment they are targeted to run on may be performed. In particular, tradeoffs may be made between the resources consumed by a model and the various aspects of the models' performance. For example, aspects of model performance may include accuracy, inference time, power consumption, ability to adapt to new input, among other aspects.

Some techniques modify an existing model to a specific environment, for example, by compressing the model or building the model for the specific environment that the model is designed to run in. However, these techniques are not adaptive. For example, the techniques may not address the dynamic changes to the available resources in the running environment. The inability of these techniques to adapt means that the model may operate inefficiently or even fail. If resource availability decreases the model may exhaust one or more of the resources and thus either fail or experience significant performance degradation. On the other hand, if more resources become available, but the model is unable to take advantage of these resources, the model may operate sub-optimally.

According to embodiments of the present disclosure, an example system includes a processor to monitor system resources and performance preferences. The processor can select model fragments based on the system resources and the performance preferences. In some examples, the processor can also select model fragments based on current model fragments being used and a cost of migrating to a new set of model fragments. In various examples, the model fragments are generated by a process running in a cloud server. The processor can also construct a running artificial intelligence (AI) model from the selected model fragments. The processor can further automatically modify the running AI model using the model fragments in response to detecting a change in the system resources or a change in the performance preferences. Thus, embodiments of the present disclosure allow a system to automatically adjust itself to work efficiently as the available resources in the running environment change using a Self-Adjusting AI Model (SAAM). The efficiency of the model can be determined by a set of rules that define the relative weight of each performance aspect based on available resources. For example, the performance aspects may include accuracy, speed, power consumption, adaptability to new input, etc. The resources may include available processing, memory, storage, power, etc. An adaptive AI model based on model fragments enables the same model to be used in many different environments while ensuring that the model performs well even when available resources change dynamically. Thus, the techniques enable AI models to operate in an efficient manner based on available resources.

In some scenarios, the techniques described herein may be implemented in a cloud computing environment. As discussed in more detail below in reference to at least FIGS. 4-6, a computing device configured to automatically modify running AI models using model fragments may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
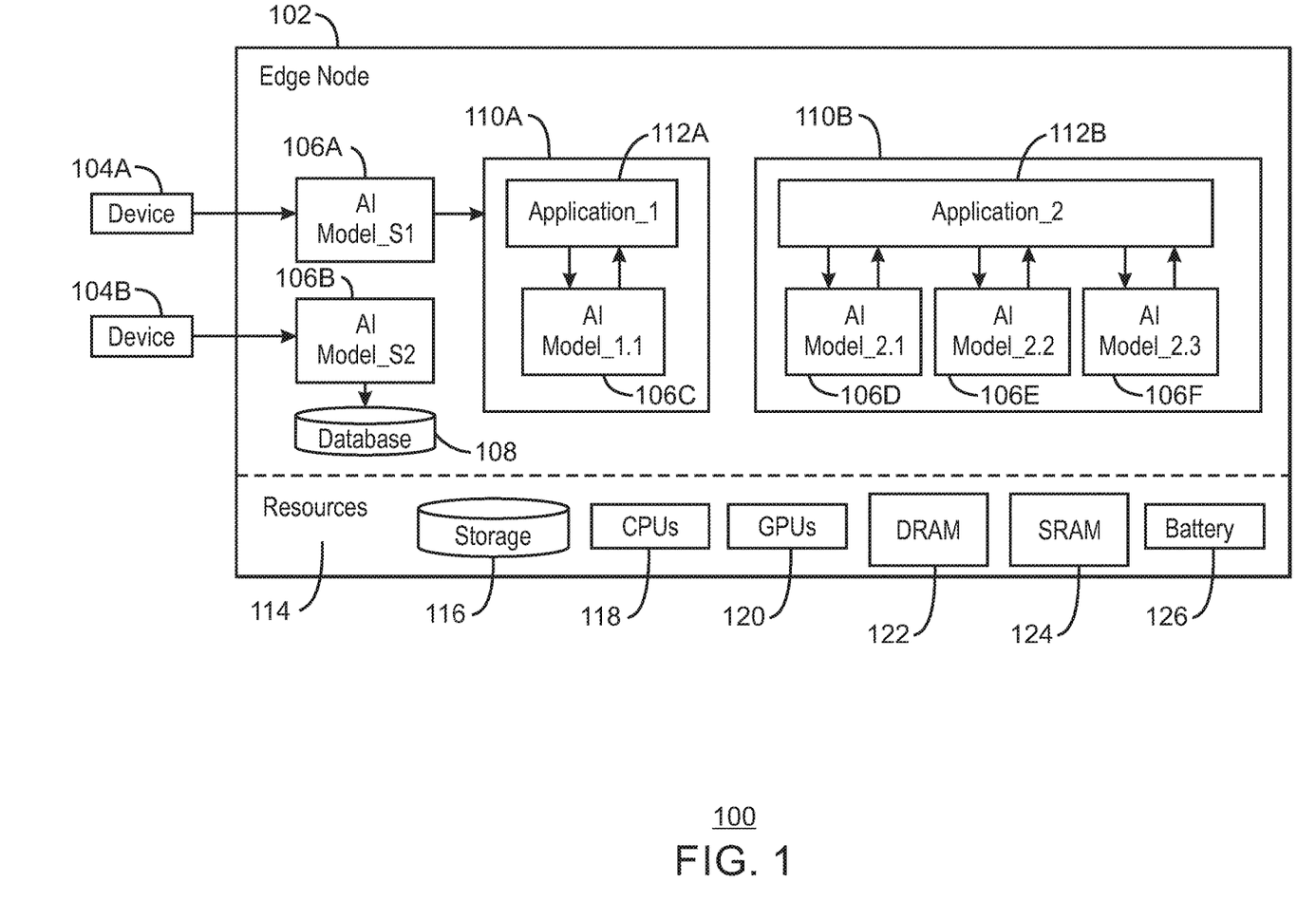
FIG. 1 is a block diagram of an example system for automatically modifying running AI models using model fragments.

With reference now to FIG. 1, a block diagram shows an example system for automatically modifying running AI models using model fragments. The example system is generally referred to by the reference number 100. FIG. 1 includes an edge node 102 communicatively coupled to a device 104A and a device 104B. The edge node 102 may be any suitable computing device, such as the computing device 400 of FIG. 4. The edge node 102 includes a first AI model S1 shown receiving data from device 104A as indicated by an arrow. For example, the device 104A may be a camera sending pictures. The edge node 102 also includes a second AI model S2 shown receiving data from device 104B. The device 104B may also be a camera sending pictures. In various examples, the first AI model S1 and the second AI model S2 may be implemented as stand-alone services. The edge node 108 also includes a database 108 shown receiving data from the second AI model S2. In various examples, the database 108 is a source of data to be processed by the first AI model S1 or the second AI model S2 or a destination for the output of the first AI model S1 or the second AI model S2. The edge node 102 further includes two containers 110A and 110B. Alternatively, or in addition, in some examples the containers 110A and 110B can be processes, virtual machines, or any other infrastructure on which applications can run. The first container 110A includes an application 112A communicatively coupled to an AI model 1.1 106C. The second container 110B includes an application 112B communicatively coupled to three AI models, including AI model 2.1 106D, AI model 2.2 106E, and AI model 2.3 106F. The edge node 102 includes resources 114. The resources 114 include a storage 116, central processing units (CPUs) 118, graphics processing units (GPUs) 120, a dynamic random-access memory (DRAM), a static random-access memory (SRAM), and a battery 126.

Still referring to FIG. 1, an edge node 102 may be a computing device that can execute various applications and services. For example, the edge node 102 could be a computer, mobile device, virtual machine, server on a board or chip, or a customized hardware. The edge node 102 provides applications access to certain hardware and software resources 114 which may include processing units (CPU 118, GPU 120, etc.), memory (DRAM 122, SRAM 124, cache, etc.), storage 116 (magnetic disk, SSD, etc.), power (battery, power supply, etc.), communication (wired, wireless, etc.), external devices, customized hardware accelerators, among other resources 114.

In various examples, one or more applications, such as applications 112A and 112B, may be running on the edge node 102. In some examples, the set of running applications may change dynamically over time. Some of the applications may use AI models to perform certain tasks. For example, application 112A is shown using AI model 106C and application 112B is shown using AI models 106D-106F. In various examples, the AI models can be embedded within the applications or run as a service outside the applications. In some examples, the AI models may also provide services to applications running outside the edge node 102. The AI models 106C-106F can be used to perform a variety of tasks. For example, the tasks can include face recognition, converting speech to text, classifying objects, identifying behavioral patterns, among other tasks.

The particular example of FIG. 1 is an example of an edge node 102 with its resources and AI models which are either embedded in applications 112A and 112B or run as independent services. In some examples, the edge node 102 can store the models in the database 108, the storage 116, the DRAM 122, or the SRAM 124.

In the example of FIG. 1, an edge node 102 can provide varying amounts of support for applications 112A and 112B by using self-adapting models constructed from model fragments (not shown). For example, the model fragments may be generated by a cloud service as described in FIG. 2. In the example of application 1 112A, the model 106C is based on a first combination of model fragments. For example, the model fragments may include different model types, parameter tunings, or compressions of a base AI model. Thus, the model 106C is a particular combination of model fragments selected for the application 112A. For example, the model 106C can be a combination of model fragments of a particular type, such as a Deep Neural Network, or any other type of model. As another examples, the model 106C can be a particular set of parameter tunings. The particular combination of model fragments for model 106C may be selected based on detected available resources 114 and a set of performance preferences received from a user. For example, the performance preferences can include power consumption, model size, model accuracy, adaptability to new input, or any combination thereof. In some examples, the performance preferences can also include preferences providing a distribution of resources between applications. As one example, the application 112A may have performance preferences indicating a preference of low power consumption, small model size, and less model accuracy. In some examples, the model 106C may be made up of a single model fragment that fits the performance preferences associated with the application 112 and the resources 114 of the edge node 102. As the performance preferences or resources 114 change, the model 106C can be updated by selecting one or more model fragments generated by a cloud service (not shown).

Similarly, the models 106D-106F associated with application 112B may also be generated from various combinations of selected model fragments. These models 106C-106F can also be updated by selecting a particular combination of model fragments in response to detecting changes to performance preferences or resources, as discussed in greater detail with respect to FIG. 2.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional devices, models, applications, databases, containers, or additional resources, etc.).

Figure 2:
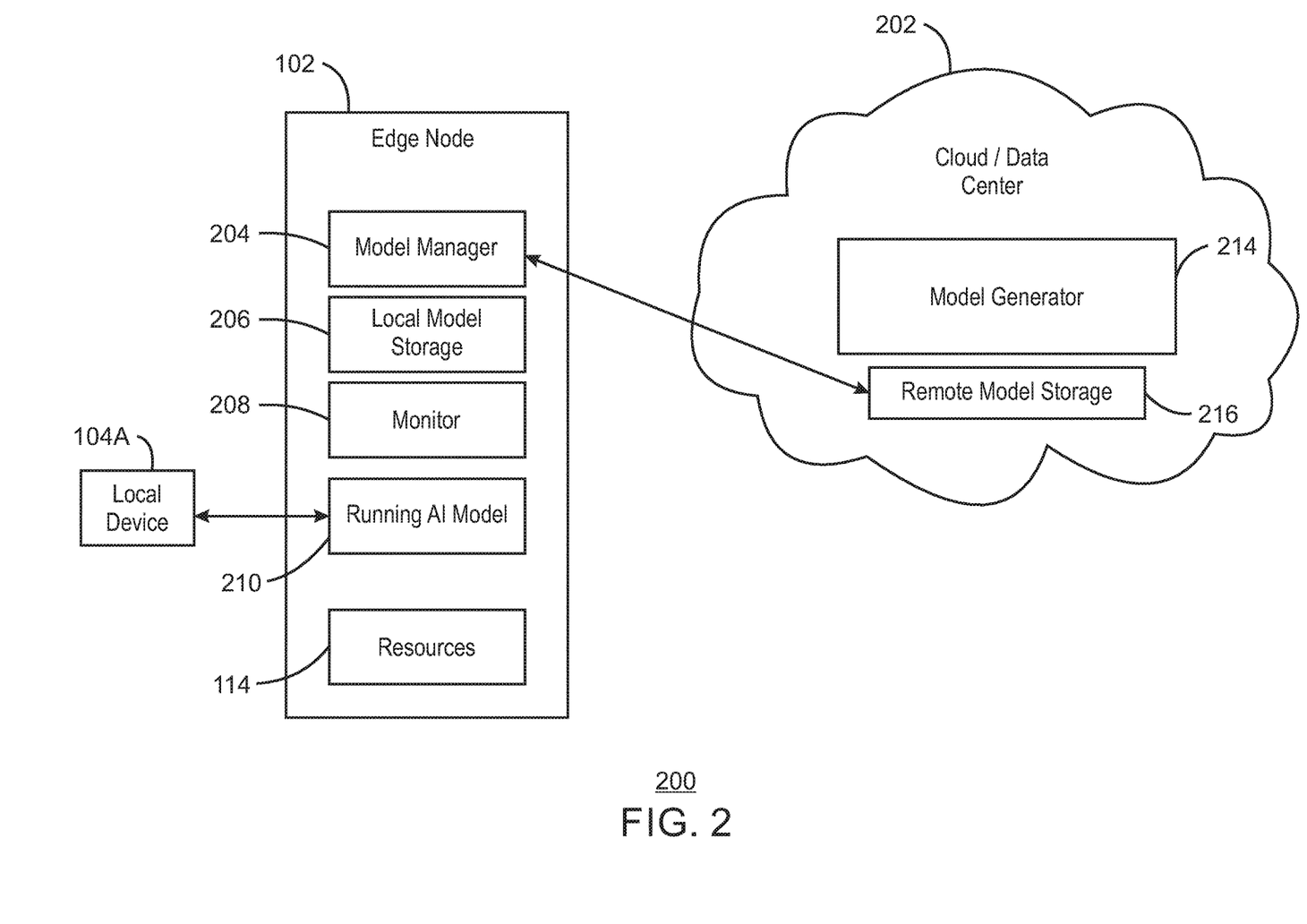
FIG. 2 is a block diagram of another example system for automatically generating and modifying running AI models.

FIG. 2 is a block diagram showing another example system for automatically generating and modifying running AI models. The example system is generally referred to by the reference number 200. FIG. 2 includes similarly numbered elements from FIG. 1. FIG. 2 also includes a cloud/data center 202 communicatively coupled to a remote model storage 204. For example, the cloud/data center 202 may be any cloud be any remote compute facility such as a public cloud, a private cloud, a data center, a server cluster, or even a single server. The system 200 also includes an edge node 102 communicatively coupled to the cloud/data center 202. For example, the edge node may be the edge node shown in FIG. 1. The edge node 102 includes a model manager 204, a local model storage 206, a monitor 208, a running AI model 210, and resources 114. The cloud/data center 202 includes a model generator 214 and a remote model storage 216. In various examples, the remote model storage 216 may be a cloud computing node or server.

In the example of FIG. 2, the running AI model 210 in combination with the model manager 204 may be referred to herein as a self-adjusting AI model (SAMM). The running AI model 210 may be made of multiple model fragments. In various examples, the model manager 204 can combine different sets of model fragments to construct running AI models 210 with specific characteristics in terms of resource consumption and performance. For example, a certain combination of model fragments may result in a running AI model 210 that consumes 1 GB of memory, uses 100 billion instructions per item, and provides average accuracy level of 90% while another combination of model fragments may result in a running AI model 210 that consumes 5 MB of memory, uses 50 million instructions per item, and provides average accuracy level of 70%.

In various examples, the model fragments are created before the running AI model 210 is created. For example, the model generator 214 can generate an AI model for a specific task of an application. In various examples, the model generator 214 generates the various model fragments and the Model Fragments Information (MFI) that describes the properties of each fragment and every possible combination of model fragments. For example, the properties may describe both the resource consumption of a model composed of the fragments and the performance characteristics. In some examples, The MFI and the model fragments are then stored in a location accessible to edge node 102. For example, the model fragments may be stored in the remote model storage 216. In some examples, when new training data is available, the model generator 214 may generate an improved model with a new set of model fragments to use. The edge node 102 may then obtain the MFI and some of or all of the model fragments it needs from the remote model storage 216.

In various examples, the model manager 204 can add or remove model fragments to or from a running AI model 210 to modify the characteristics of the running AI model 210. For example, the model manager 204 can add or remove one or more model fragments to improve the running AI model's 210 accuracy, reduce inference time, reduce power consumption, or reduce memory consumption.

In various examples, the monitor 208 may be responsible for constantly monitoring the available resources on the edge node 102 and the performance preferences provided by the user. The model manager 204 may receive information about the current system resources available, and the performance preferences, from the monitor 208. When the model manager 204 detects a change in the available resources or the performance preferences, the model manager 204 can find the best configuration of model fragments for the running AI model 210 in the new conditions. The model manager 204 can obtain updated fragment information from the remote model storage 216. If a change is to be made to the current running AI model 210, the model manager 204 performs the transition from the current set of model fragments to the new set of model fragments. In various examples, the model manager 204 selects the best set of model fragments from which to construct the updated running AI model 210. The model manager 204 may take various factors into account selecting the new set of model fragments. For example, the model manager 204 may take the implications of making the transition from one configuration to another into consideration when deciding on a new configuration of model fragments. For example, the transition may include an interruption to the service and the time to obtain the new set of model fragments. For example, the model manager 204 can check if the selected fragments are available in the local model storage 206. If not, the model fragments are to be retrieved from the remote model storage 216.

Still referring to FIG. 2, the local model storage 206 is storage available to the model manager 204 in the local environment of the edge node 102. For example, the local model storage 206 can be used to store some, or all, of the information used to construct different running AI models 210. In some examples, the information stored in the local model storage 206 includes model fragments along with model fragment information that can include instructions of how to construct a running AI model with specific characteristics. In some examples, part of the information is stored locally in the local model storage 206 while the rest of the information is stored in the remote model storage 216. In such cases, the model manager 204 can determine what information is to be stored in the local model storage 206 and is responsible to retrieve information from the remote model storage 216. The local model storage 206 can be implemented using a database, one or more files, a caching utility, or any other mode of storage.

In various examples, the remote model storage 216 extends the local model storage 206 to provide larger capacity. For example, the remote model storage 216 can store all the information and the local storage 206 may hold just the information that is used to make small changes to the running AI model 210. In various examples, the remote model storage 216 is optional. For example, if the local model storage 206 is large enough to store all the information, then the remote model storage 216 may not be included. In various examples, the remote model storage 216 can be implemented using a cloud object store, remote database service, network file system, or any other storage utility that provides a suitable capacity. In some examples, information such as model fragments and model fragment information may be copied to the local model storage 206 in response to predicting that the model fragments will be used in an updated running AI model.

In various examples, the model manager 204 constructs an updated AI model 210 based on selected model fragments. The updated AI model is then used to replace the running AI model 210. The new running AI model 210 is used by applications/devices running on or using the edge node. The model manager 204 is thus responsible to keep the running AI model 210 operating efficiently given the available resources and the performance preferences. In various examples, when a change to the currently running AI model is detected, the model manager 204 adds or removes model fragments to or from the running AI model 210 to generate an updated running AI model 210 with the desired properties in terms of resource consumption and performance metrics.

As one example, the running AI model 210 can be constructed using a single model fragment. When the self-adjusting AI model (SAAM) is created, the model generator 214 creates a series of AI models with different characteristics. For example, in many cases it is possible to trade off accuracy verses model size and inference time. The model generator 214 can therefore create a series of models with increasing sizes and increasing accuracy. Each such model can act as a model fragment for the SAAM. The model manager 204 can then select the best model to use based on the available memory and processing capabilities such that the accuracy is the highest possible, assuming the case where the performance preference indicates accuracy as the primary goal. If more memory becomes available, the model manager 204 can select a new model fragment that is larger but provides better accuracy and replace the existing model fragment with the new one. Similarly, if the available memory or processing capabilities drop, the model manager 204 may select to use a model fragment with lower memory and processing usage, but also less accuracy.

In various examples, to create models with different characteristics, the model generator 214 can select different types of models and for each model type tune different parameters such as the number of layers, number of nodes in each layer, etc. For example, the different types of models can include a Deep Neural Network, Decision Tree, Convolutional Neural Network, Random Forest, etc. In some examples, the model generator 214 can apply different compression procedures, such as quantization, pruning, or factorization, to modify certain characteristics of a given model.

In some examples, a multiple fragment AI model can be generated and updated. As one example, the model generator 214 can generate model fragments based on compression techniques that can be efficiently reversed. For example, the model generator 214 can start with an original large model that achieves the best accuracy but uses a large amount of memory, storage, and power per inference. The model generator 214 can then reduce the original model using lossless compression techniques to get to one or more base models. Through a series of additional compression steps, the model generator 214 can gradually modify the base model to reduce memory, storage, or power usage, but also potentially reduce the accuracy or the ability of the model to adapt to new input. In some examples, at each compression step, the difference between the initial model and the compressed model can be efficiently represented as a model fragment. The model fragment can then be used by the model manager 204 to construct the compressed model from the initial model and vice versa. This allows the model manager 204 to modify the model characteristics by applying small incremental changes.

In various examples, the model generator 214 can generate model fragments using any suitable compression techniques. For example, the model generator 214 can use quantization to generate model fragments. In quantization, the weights of the edges are represented in a more compact way. For example, instead of a 32-bit integer the edges may be represented using 16-bit, or 8-bit, or a 4-bit integer. Quantization may significantly reduce the inference time, the power consumption, and the model size. If quantization is applied in stages such that in each stage the number of bits is gradually reduced or that in each stage only some of the weights are quantized, then the model fragment can represent the original weights for the edges that were modified. In some examples, some rounding may also be used for the weights. As one quantization example, an initial model M1 is a neural-network with 3 layers where the weights are represented using 32-bit. The model generator 214 can quantize the weights of the edges between layers one and two to 16-bit integers to produce model M2. The model generator 214 can represent the original (32-bit) weights in a compact way to produce model fragment MF1. The model generator 214 can then quantize the weights of the edges between layers two and three to 16-bit integers to produce model M3 and represent the original weights in model fragment MF2. In various examples, the model generator 214 can repeat the process going from 16-bits to 8-bits to produce models M4 and M5 and model fragments MF3 and MF4. In one example, assuming model generator 214 stops there, the model generator 214 can represent M5 as the base model fragment MF5. The model manager 204 can then select from any model (M1 through M5) to any other model by adding or removing model fragments from MF5. In some examples, each AI model may have different characteristics in terms of resource consumption and performance with an overall trend that M5 is the smallest and least accurate model and M1 the largest and most accurate model.

In various examples, the model generator 214 can perform compression using pruning. With pruning, some of the nodes and edges of a neural network are removed from the original model to create a more compact model. In some examples, when possible, the compact model is then retrained. Pruning may dramatically reduce the model size as well as its power consumption and processing use. If pruning is performed in stages such that in each stage a small percentage of the nodes/edges are pruned, then each model fragment generated by the model generator 214 can represent the portion that has been removed.

As one pruning example, a base model M1 has 100 nodes. In the first pruning stage, the model generator 214 removes 30 nodes to produce model M2 and represent the nodes that have been removed along with their edges in a compact way in model fragment MF1. The model generator 214 repeats the process pruning another 20 nodes to produce M3 and MF2 and finally prunes another 10 nodes to produce M4 and MF3. In this example, the model manager 204 may use M4 (with 40 nodes) as a base and represents the base in model fragment MF4. Unlike in the quantization example, the model manager 204 can only add or remove the model fragments in the right order. For example, the model manager 204 can modify the running AI model 210 from M4 to M3 by adding MF4, but to modify the running AI model 210 from M3 to M1, the model manager 204 adds both MF2 and MF1. The model manager 204 can also modify the running AI model 210 in the opposite direction by removing model fragments, for example from M1 to M2 by removing MF1. In each step, the model manager 204 can either increase the model and improve its accuracy by adding a fragment, or decrease the model and its accuracy by removing a fragment.

In some examples, the model generator 204 may use compression that also includes weight rounding. In weight rounding, the model generator 204 rounds the weights of the model, but the number of bits representing a weight does not change. This may help to reduce the size of the compressed model. Weight rounding may thus reduce storage space and download time. If weight rounding is done in stages such that in each stage a small percentage of the weights are rounded, then each model fragment can represent the original weight of the weights that have been rounded. In various examples, other compression techniques may be used by the model generator 204 to achieve better efficiency in using model fragments to serve SAAMs.

In various examples, if the running environment allows it, the model manager 204 can retrain the model after making a change to the model fragments that compose the adaptive AI model. In some examples, retraining may be performed on the edge node itself or remotely in the cloud or data center. After retraining, the model manager 204 can update the running model. For example, the model manager 204 can replace the running model with the trained model.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional computing devices, models, or storages, etc.). For example, additional components may be included to achieve better efficiency, provide better control on how model fragments can be combined to achieve the desired results, and apply to different types of AI domains and model types. In some examples, multiple edge nodes 102 may run the same AI model 210 or any combination of different AI models 210 with different combinations of model fragments.

Figure 3:
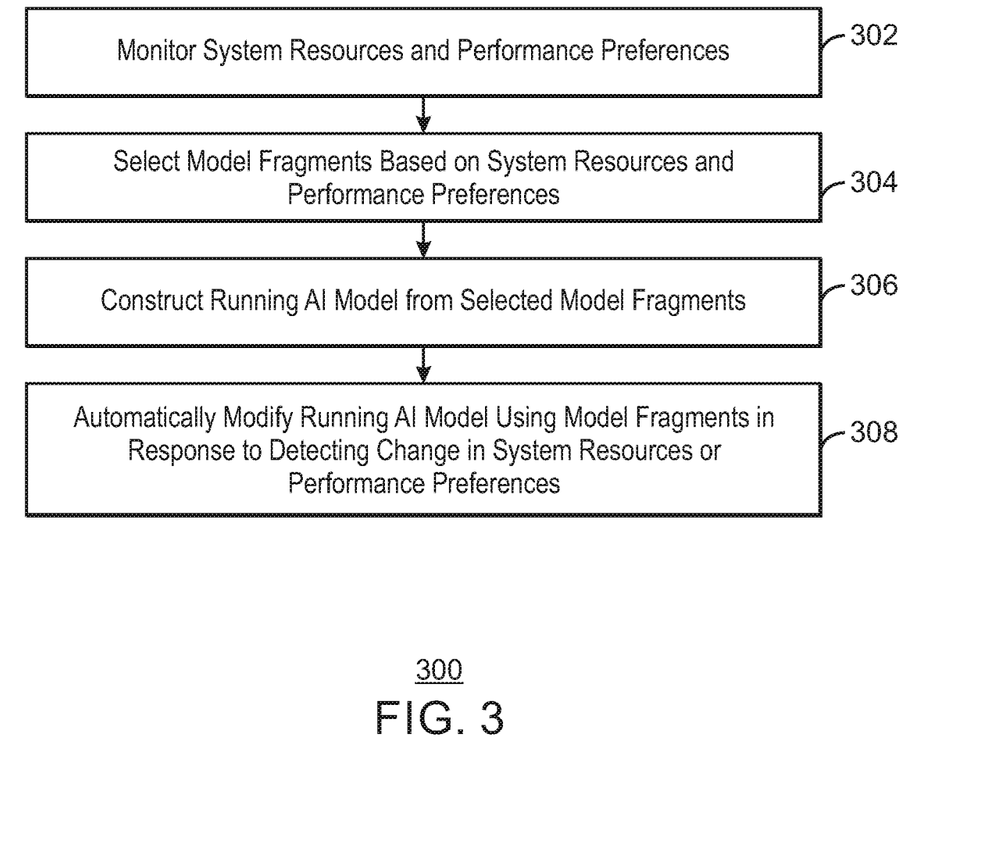
FIG. 3 is a block diagram of an example method that can automatically modify running AI models using model fragments.

FIG. 3 is a process flow diagram of an example method that can automatically modify running AI models using model fragments. The method 300 can be implemented with any suitable computing device, such as the computing device 400 of FIG. 4 and is described with reference to the systems 100 and 200 of FIGS. 1 and 2. For example, the methods described below can be implemented by the processor 402 of the computing system of FIG. 4.

At block 302, system resources and performance preferences are monitored. In various examples, monitoring resources can be performed by utilities provided by the operating system, via direct access to hardware, or by using tools that provide such services. For example, operating systems may provide simple utilities to monitor resources such as free memory, CPU utilization, CPU cycles consumed by each process, free storage space, remaining battery power, network utilization, and other resources. In some examples, tools that perform resource monitoring and provide applications easy access to the data may be used to monitor system resources. In various examples, the performance preferences may be defined in a variety of ways. For example, performance preferences may be defined by assigning a weight to every performance metric. As one example, an 80% weight may be assigned to model accuracy and a 20% weight may be assigned to low power consumption. In some examples, thresholds can be used for each metric. As one example, a first threshold may be for model accuracy above 0.85 and a second threshold may be for inference time below 1 millisecond. In various examples, a set of rules of what performance preference to use may be provided. For example, the set of rules may depend on factors such as available resources, time, or certain events. As one example, if remaining power is more than 30% a metric_1 may be used, otherwise a metric_2 may be used. In some examples, monitoring performance preferences can be done by receiving a notification whenever the performance preferences are modified or by periodically reading the performance preferences and identifying changes. In various examples, the performance preferences may be provided in a variety of ways. For example, the performance preferences may be provided as a file on the file system, a record in a database, or a message sent to the model manager. In some examples, the system resources can also be predicted based on historical data or usage profiles, among other information. For example, the system resources can be predicted based on detected trends and patterns, or by accounting for certain events, such as weekend, sales days, planned maintenance, etc.

At block 304, model fragments are selected based on the system resources and the performance preferences. In some examples, the model fragments are also selected based on current model fragments being used, and a cost of migrating to a new set of model fragments. For example, the model fragments may be different compressions of a model. In some examples, the model fragments may be different parameter turnings for a model. In some examples, the model fragments may be different model types for the model.

At block 306, a running artificial intelligence (AI) model is constructed from the selected model fragments. For example, predicted system resources can be used to construct an updated running AI model in advance. In various examples, the AI model may also be constructed based on the current model fragments. For example, the current model fragments are model fragments that are presently being used in a running AI model. In some examples, the AI model may also be constructed based on a cost of migrating to a new set of model fragments. For example, if a cost of migrating to a new set of model fragments exceeds a threshold cost, then the updated running AI model may not be constructed.

At block 308, the running AI model is automatically modified using the model fragments in response to detecting a change in the system resources or a change in the performance preferences. In some examples, the running AI model is halted, the AI model modified, and the modified AI model executed. For example, a model fragment is added to the running AI model or a model fragment is subtracted from the running AI model. In various examples, the running AI model can be enhanced by adding a model fragment in response to detecting an increase in a system resource or reduced by removing a model fragment in response to detecting a decrease in a system resource.

The process flow diagram of FIG. 3 is not intended to indicate that the operations of the method 300 are to be executed in any particular order, or that all of the operations of the method 300 are to be included in every case. For example, if the same model fragments are selected at block 304, then the additional blocks may not be performed. Additionally, the method 300 can include any suitable number of additional operations. For example, the method 300 can further include retraining the modified running AI model. In some examples, the method 400 may include generating the model fragments and model fragment information. In some examples, the model fragments are generated based on an AI model generated for an application. For example, generating the model fragments may include pruning a node or an edge of the generated AI model. In some examples, generating the model fragments may include quantizing a weight of the generated AI model. In some examples, generating the model fragments may include rounding a weight of the generated AI model.

Figure 4:
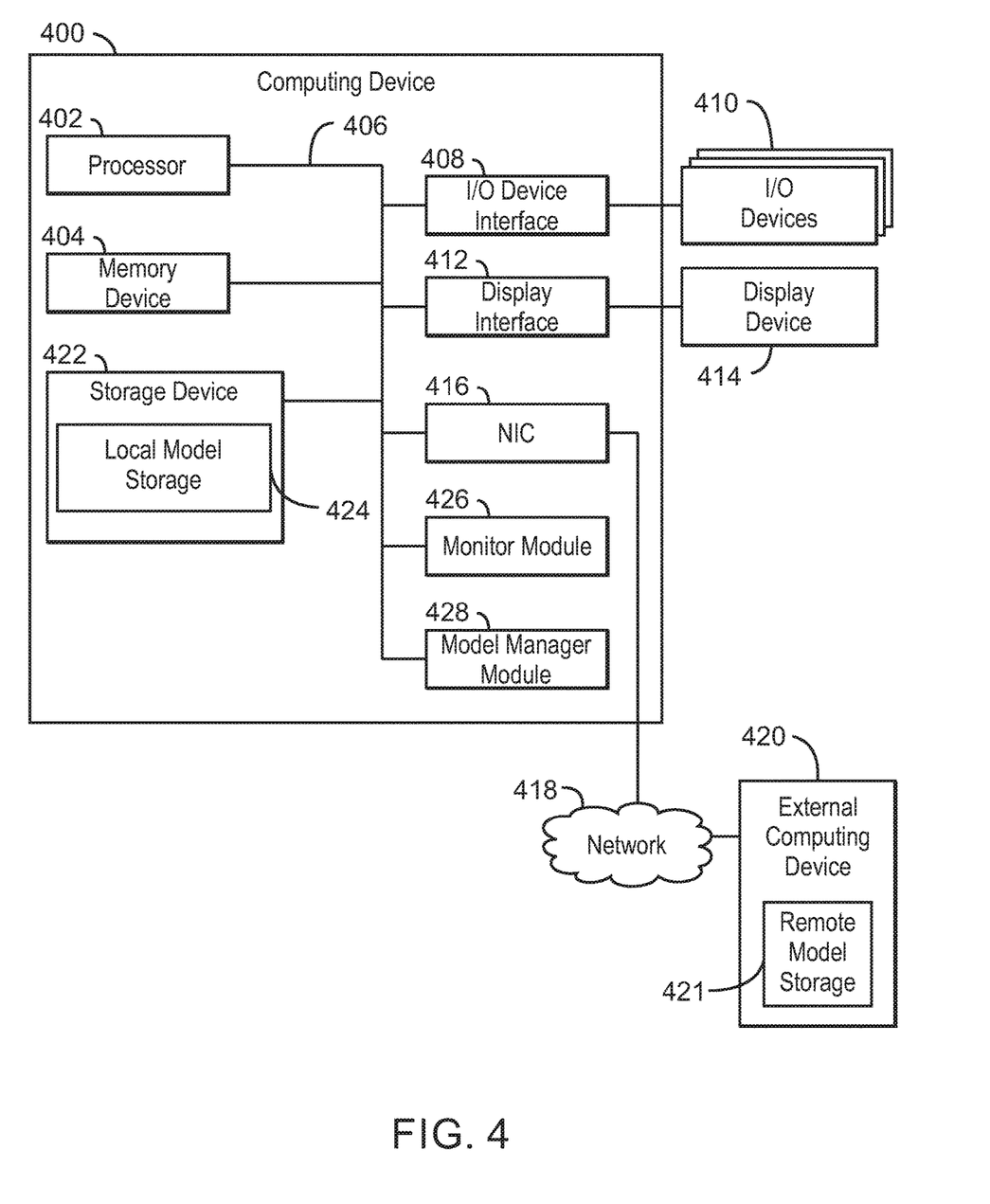
FIG. 4 is a block diagram of an example computing device that can automatically modify a running AI model using model fragments.

FIG. 4 is block diagram of an example computing device that can automatically modify a running AI model using model fragments. The computing device 400 may be for example, a server, desktop computer, laptop computer, tablet computer, or smartphone. In some examples, computing device 400 may be a cloud computing node. In some examples, the computing device 400 may be an edge device in a mobile device, cars, or industrial quality inspection units. The computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external web-server 420. In some examples, external computing device 420 may be a cloud computing node. The external computing device 420 can include a model generator to generate model fragments and model fragment information. In various examples, the model fragments are generated based on a reversible compression of a generated AI model. For example, the AI model may be generated by the external computing device 420 for a particular application. The external computing device 420 can also include a remote model storage 421. For example, the remote model storage 421 can store all the generated model fragments as well as associated model fragment information.

The processor 402 may also be linked through the system interconnect 406 to a storage device 422 that can include a hard drive, an optical drive, a USB flash drive, an array of drives, or any combinations thereof. In some examples, the storage device may include a local model storage 424. For example, the local model storage 424 may store model fragments and associated model fragment information. The local model storage 424 can store model fragments including model fragments having different model types, parameter tunings, or compressions.

The processor 402 may also be linked through the system interconnect 406 to a monitor module 426 and a model manager 428. The monitor module 426 can monitor system resources and performance preferences. For example, the system resources are associated with an edge computing device executing a running AI model. In various examples, the system resources can include available processing, free memory, free storage space, available power, or any combination thereof. In some examples, the performance preferences include power consumption, model size, model accuracy, adaptability to new input, or any combination thereof. In some examples, the model manager module 428 can select the model fragments based on the system resources, the performance preferences, current model fragments being used and a cost of migrating to a new set of model fragments. In various examples, the model fragments can be combined to provide different model types, parameter tunings, or compressions for the running AI model. The model manager module 428 can construct a running artificial intelligence (AI) model from the generated model fragments. The model manager module 428 can also automatically modify the running AI model using the model fragments in response to detecting a change in the system resources or a change in the performance preferences. In some examples, the model manager module 428 can also predict a change in system resources and construct a modified AI model to replace the running AI model. In some examples, the model manager module 428 can store the model fragments in a local model storage.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the monitor module 426 or the model manager module 428 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the monitor module 426 or the model manager module 428 can be implemented with logic, wherein the logic, as referred to herein, can include any suitable hardware (e.g., a processor, among others), software (e.g., an application, among others), firmware, or any suitable combination of hardware, software, and firmware.

Figure 5:
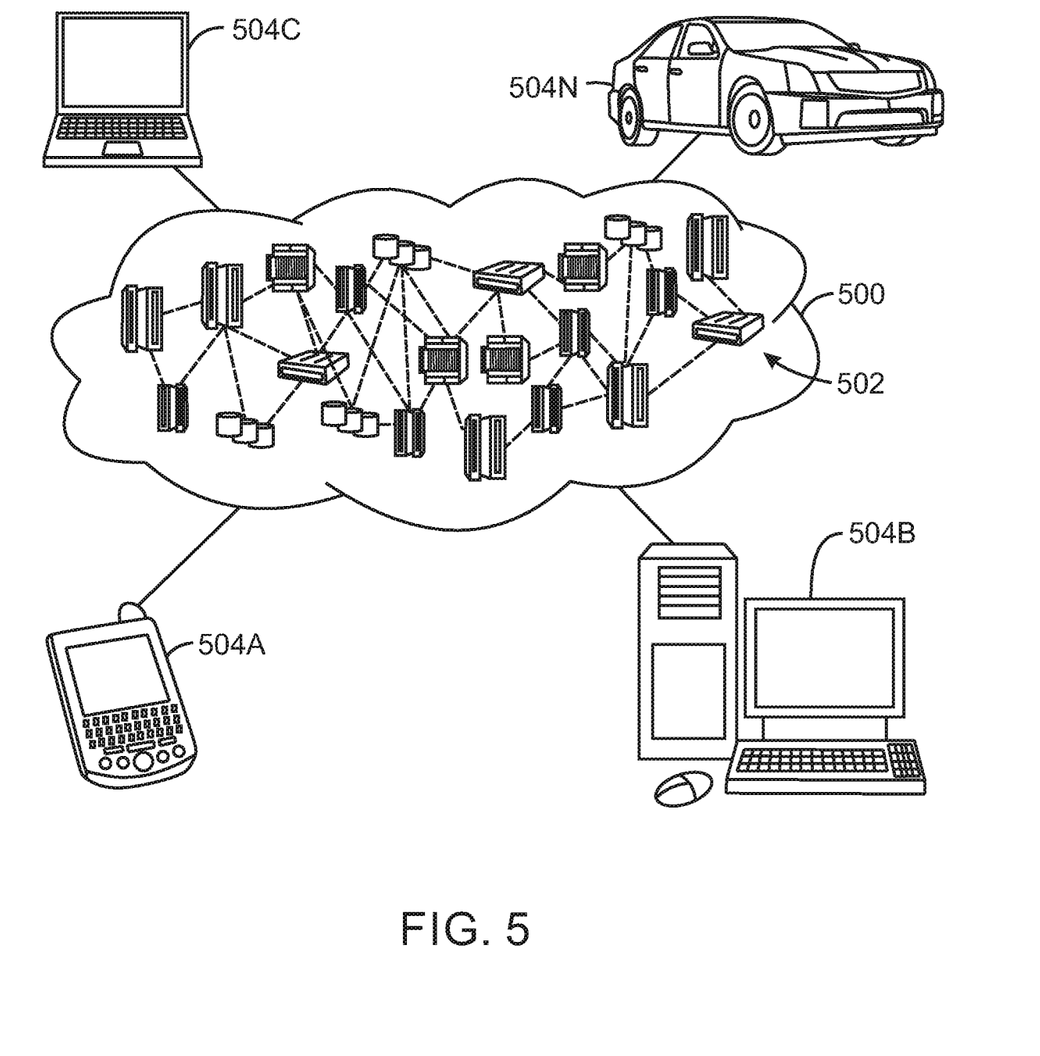
FIG. 5 is a process flow diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
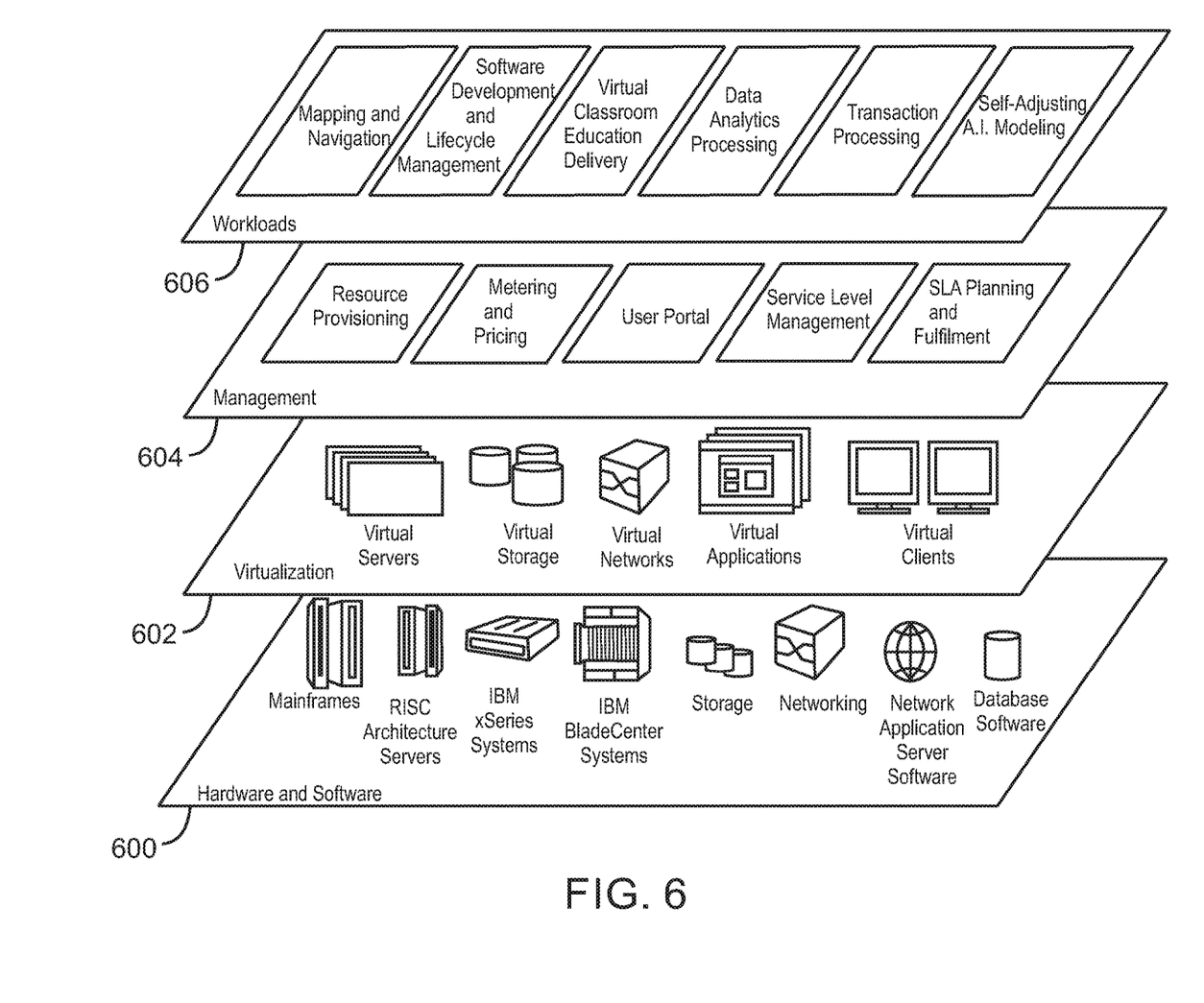
FIG. 6 is a process flow diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and self-adjusting artificial intelligence (AI) modeling.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
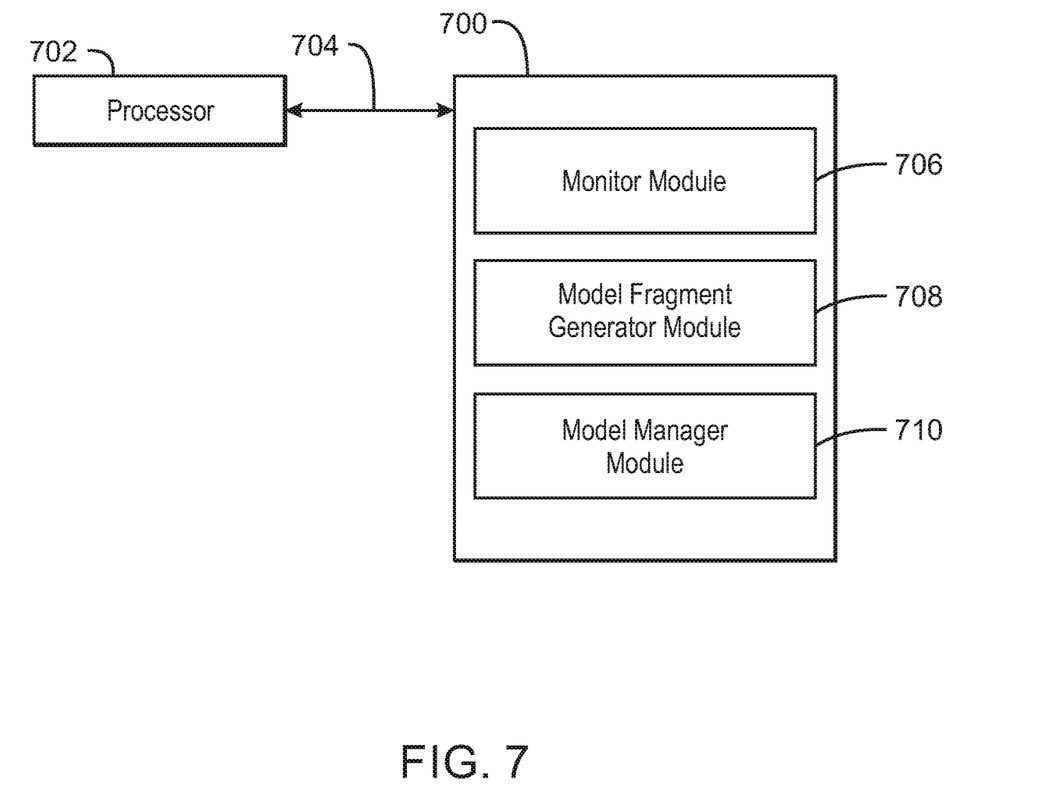
FIG. 7 is an example tangible, non-transitory computer-readable medium that can automatically modify running AI models using model fragments.

Referring now to FIG. 7, a block diagram is depicted of an example tangible, non-transitory computer-readable medium 700 that can automatically modify running AI models using model fragments. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3.

The various software components discussed herein may be stored on the tangible, non-transitory, computer-readable medium 700, as indicated in FIG. 7. For example, a monitor module 706 includes code to monitor system resources and performance preferences. In some examples, the monitor module 706 includes code to predict the system resources based on historical data or usage profiles, among other information. For example, the monitor module 706 can include code to predict the system resources based on detected trends and patterns, or by accounting for certain events, such as weekend, sales days, planned maintenance, etc. A model fragment generator module 708 includes code to generate model fragments based on different model types, parameter tunings, or compressions. The model fragment generator module 708 can be installed on and executed by a processor of a remote device (not shown). For example, the remote device may be a cloud server or cloud node. In various examples, the model fragment generator module 708 also includes code to prune a node or an edge of the running AI model using a model fragment of the model fragments. In some examples, the model fragment generator module 708 also includes code to quantize a weight of the running AI model using a model fragment of the model fragments. In some examples, the model fragment generator module 708 also includes code to weight round a weight of the running AI model using a model fragment of the model fragments. In some examples, the model fragment generator module 708 includes code to store a subset of the model fragments on a local storage based on the predicted system resources. The model manager module 710 includes code to select model fragments based on system resources and performance preferences. The model manager module 710 includes code to select model fragments based on the system resources, the performance preferences, current model fragments being used, a cost of migrating to a new set of model fragments, or any combination thereof. In some examples, the model manager module 710 includes code to predict a change in system resources and construct a modified AI model to replace the running AI model. The model manager module 710 includes code to construct a running artificial intelligence (AI) model from the selected model fragments. The model manager module 710 also includes code to automatically modify the running AI model using the model fragments in response to detecting a change in the system resources or a change in the performance preferences. For example, the model manager module 710 can include code to enhance the running AI model using a model fragment in response to detecting an increase in a system resource or reduce the running AI model using a model fragment in response to detecting a decrease in a system resource. In some examples, the model manager module 710 includes code to halt the running AI model, modify the AI model, and execute the modified AI model. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
monitor system resources and performance preferences, wherein the system resources comprise currently available processing at an edge device running an artificial intelligence (AI) model;
receive, at the edge device, model fragments and model fragments information that describes properties of each model fragment and properties of a plurality of different combinations of the model fragments, wherein the model fragments comprise different additional incremental compressions of a base model that is initially compressed using a lossless compression;
select, at the edge device, model fragments based on the system resources, the performance preferences, and the model fragments information comprising properties of the different additional incremental compressions;
construct a second AI model from the selected model fragments; and
automatically modify the running AI model based on the second AI model using the model fragments in response to detecting a change in the system resources or a change in the performance preferences.

2. The system of claim 1, wherein the system resources further comprise free memory, free storage space, available power, or any combination thereof.

3. The system of claim 1, wherein the performance preferences comprise power consumption, model size, inference time, model accuracy, adaptability to new input, or any combination thereof.

4. The system of claim 1, wherein the processor is to select the model fragments based on the system resources, the performance preferences, current model fragments being used and a cost of migrating to a new set of model fragments.

5. The system of claim 1, wherein the model fragments comprise different model types, parameter tunings, or compressions of an AI model.

6. The system of claim 1, wherein the processor is to predict a change in system resources and construct a modified AI model to replace the running AI model.

7. The system of claim 1, wherein the model fragments comprise differences between compressed models generated using reversable compression techniques.

8. A computer-implemented method, comprising:
monitoring, via a processor of an edge device, system resources and performance preferences, wherein the system resources comprise currently available processing at the edge device running an artificial intelligence (AI) model;
receiving, via the processor, model fragments and model fragments information that describes properties of each model fragment and properties of a plurality of different combinations of the model fragments, wherein the model fragments comprise different additional incremental compressions of a base model that is initially compressed using a lossless compression;
selecting, via the processor, model fragments based on the system resources, the performance preferences, and the model fragments information comprising properties of the different additional incremental compressions;
constructing, via the processor, a second AI model from the selected model fragments; and
automatically modify, via the processor, the running AI model based on the second AI model using the model fragments in response to detecting a change in the system resources or a change in the performance preferences.

9. The computer-implemented method of claim 8, wherein selecting the model fragments is based on the system resources and the performance preferences, current model fragments being used, and a cost of migrating to a new set of model fragments.

10. The computer-implemented method of claim 8, wherein automatically modifying the running AI model comprises enhancing the running AI model using a model fragment in response to detecting an increase in a system resource or reducing the running AI model using a model fragment in response to detecting a decrease in a system resource.

11. The computer-implemented method of claim 8, comprising predicting a change in system resources and constructing a modified AI model to replace the running AI model.

12. The computer-implemented method of claim 8, comprising generating the model fragments, wherein generating the model fragments comprises pruning a node or an edge of a generated AI model.

13. The computer-implemented method of claim 8, comprising generating the model fragments, wherein generating the model fragments comprises quantizing a weight of a generated AI model.

14. The computer-implemented method of claim 8, comprising generating the model fragments, wherein generating the model fragments comprises weight rounding a weight of a generated AI model.

15. The computer-implemented method of claim 8, comprising retraining the modified running AI model.

16. A computer-readable storage medium for automatically modify running AI models using model fragments, the computer-readable storage medium having program code embodied therewith, the program code executable by a processor to cause the processor to:
monitor system resources and performance preferences, wherein the system resources comprise currently available processing at an edge device running an artificial intelligence (AI) model;
receive, at the edge device, model fragments and model fragments information that describes properties of each model fragment and properties of a plurality of different combinations of the model fragments, wherein the model fragments comprise different additional incremental compressions of a base model that is initially compressed using a lossless compression;
select model fragments based on the system resources, the performance preferences, and the model fragments information comprising properties of the different additional incremental compressions;
construct a second AI model from the selected model fragments; and
automatically modify the running AI model based on the second AI model using the model fragments in response to detecting a change in the system resources or a change in the performance preferences.

17. The computer-readable storage medium of claim 16, further comprising program code executable by the processor to select the model fragments based on the system resources, the performance preferences, current model fragments being used, and a cost of migrating to a new set of model fragments.

18. The computer-readable storage medium of claim 16, further comprising program code executable by the processor to enhance the running AI model using a model fragment in response to detecting an increase in a system resource or reduce the running AI model using a model fragment in response to detecting a decrease in a system resource.

19. The computer-readable storage medium of claim 16, further comprising program code executable by the processor to predict a change in system resources and construct a modified AI model to replace the running AI model.

20. The computer-readable storage medium of claim 16, further comprising program code executable by the processor to predict the system resources based on historical data or usage profiles, wherein the processor is to store a subset of the model fragments on a local storage based on the predicted system resources.

* * * * *